US011922771B2

(12) United States Patent
Amaitis et al.

(10) Patent No.: US 11,922,771 B2
(45) Date of Patent: *Mar. 5, 2024

(54) SINGLE AND/OR MULTI-PROCESS COMMUNICATION REGARDING SKILL AND/OR LUCK BASED GAMES

(71) Applicant: CFPH, LLC, New York, NY (US)

(72) Inventors: Lee Amaitis, Las Vegas, NV (US); Phillip Flaherty, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 17/326,426

(22) Filed: May 21, 2021

(65) Prior Publication Data

US 2021/0272420 A1 Sep. 2, 2021

Related U.S. Application Data

(63) Continuation of application No. 16/239,232, filed on Jan. 3, 2019, now Pat. No. 11,017,636, which is a continuation of application No. 13/086,624, filed on Apr. 14, 2011, now abandoned.

(51) Int. Cl.
*G07F 17/32* (2006.01)

(52) U.S. Cl.
CPC ................................ *G07F 17/3267* (2013.01)

(58) Field of Classification Search
CPC .. G07F 17/32; G07F 17/3295; G07F 17/3267; G07F 17/3272; G07F 17/3274; G07F 17/3276
See application file for complete search history.

(56) References Cited

U.S. PATENT DOCUMENTS

| | | | |
|---|---|---|---|
| 7,727,072 | B2 | 6/2010 | Baili |
| 8,337,300 | B2 | 12/2012 | Bowers et al. |
| 11,017,636 | B2 | 5/2021 | Amaitis et al. |
| 2003/0119581 | A1 | 6/2003 | Cannon |
| 2003/0125107 | A1 | 7/2003 | Cannon |
| 2006/0121971 | A1 | 6/2006 | Slomiany et al. |
| 2007/0135951 | A1 | 6/2007 | Romik et al. |
| 2007/0167210 | A1 | 7/2007 | Kelly et al. |
| 2007/0265063 | A1 | 11/2007 | McNally |
| 2010/0029381 | A1 | 2/2010 | Vancura |
| 2010/0279755 | A1 | 11/2010 | Pacey |
| 2011/0034237 | A1 | 2/2011 | Schulhof et al. |
| 2011/0053676 | A1 | 3/2011 | Wolf |

(Continued)

FOREIGN PATENT DOCUMENTS

| | | |
|---|---|---|
| CN | 101163526 A | 4/2008 |
| CN | 101356533 A | 1/2009 |
| WO | WO 2006063054 | 6/2006 |

OTHER PUBLICATIONS

Notification of Transmittal of the International Search Report and the Written Opinion of the International Searching Authority for International Application No. PCT/US12/33563 dated Jul. 5, 2012 (7 pages).

*Primary Examiner* — James S. McClellan
*Assistant Examiner* — Ross A Williams

(57) ABSTRACT

Some embodiments may include one or more methods and/or apparatus related to play of a first game, qualifying a player to play a second game based at least in part on play of a first game, play of a second game, skill-based games, and/or luck-based games. Further embodiments may be described.

15 Claims, 5 Drawing Sheets

(56) References Cited

U.S. PATENT DOCUMENTS

| | | | |
|---|---|---|---|
| 2011/0092274 | A1 | 4/2011 | Low et al. |
| 2011/0118011 | A1 | 5/2011 | Filipour |
| 2011/0207523 | A1 | 8/2011 | Filipour |
| 2011/0218035 | A1 | 9/2011 | Thomas |
| 2011/0263312 | A1 | 10/2011 | De Waal et al. |
| 2011/0294561 | A1 | 12/2011 | Shaw et al. |
| 2012/0122553 | A1 | 5/2012 | Bunch et al. |
| 2012/0264495 | A1 | 10/2012 | Amaitis et al. |
| 2023/0098012 | A1* | 3/2023 | Decasa, Jr/ ......... G07F 17/3213 463/25 |

* cited by examiner

SINGLE AND/OR MULTI-PROCESS COMMUNICATION REGARDING SKILL AND/OR LUCK BASED GAMES

CROSS REFERENCE TO RELATED APPLICATIONS

The present application is a continuation of U.S. patent application Ser. No. 16/239,232 filed Jan. 3, 2019 which is a continuation of U.S. patent application Ser. No. 13/086,624, filed Apr. 14, 2011, the entireties of which are hereby incorporated by reference.

FIELD

Some embodiments may generally relate to gaming, skill-based games, and/or luck-based games.

BACKGROUND

Gaming devices, such as clot machines, computers, smart phones, and so on may be used by individuals.

Gaming, such as casino gaming, sports wagering, video gaming, and/or various other forms of gaming may be performed.

SUMMARY

The following should be understood as example embodiments, and not as claims.

A. A method comprising: facilitating, by a computing device, play of a first round of a luck-based game by a first player, in which outcomes of the luck based game are based on a random event determination; facilitating, by the computing device, play of a second round of the luck-based game by a second player; allocating to a jackpot, by the computing device, at least one of: a portion of each of a first wager by the first player in the first round and a second wager by the second player in the second round and winnings of the first player from the first round and the second player from the second round; determining, by the computing device, an outcome of the first round and an outcome of the second round based on respective random event determinations; determining, by the computing device, that the outcome of the first round qualifies the first player to play a skill-based game; determining, by the computing device, that the outcome of the second round qualifies the second player to play the skill-based game, in which outcomes of the skill-based game are based on skill of players playing the skill-based game; facilitating, by the computing device, play of a round of the skill-based game by the first player and the second player in response to the determination that the outcome of the first round qualifies the first player to play the skill-based game and the determination that the outcome of the second round qualifies the second player to play the skill-based game, in which the round includes a round played by the first player against the second player; determining, by the computing device, a winner of the round of the skill-based game from among the first player and second player based on skill of each of the first player and the second player exercised in play of the round of the skill-based game; and awarding, by the computing device, at least a part of the jackpot to the winner in response to determining the winner.

A.1. The method of claim 1, further comprising: preventing at least one third player from playing the skill-based game based on an outcome of a third round of the luck-based game played by the third player. A.1.1. The method of claim A.1, further comprising: allocating at least a portion of a third wager by the third player in the third round to the jackpot. A.2. The method of claim A, In which the skill-based game includes a game in which outcomes of the game are not based on a random event. A.3. The method of claim A, In which facilitating play of the first round includes presenting an interface through which the first player may play the luck-based game. A.4. The method of claim A, In which facilitating play of the round of the skill-based game includes: determining that the first and second players are ready to play the round of the skill-based game. A.5. The method of claim A, In which facilitating play of the round of the skill-based game includes: matching the first and second player together for play of the round of the skill-based game. A.5.1. The method of claim A.5, in which matching includes matching based on location of each of the first and second player being in a same casino that is different from at least one third player who is also qualified to play the skill-based game.

A.6. The method of claim A, In which facilitating play of the round of the skill-based game includes: providing an interface to each of the first and second player through which each of the first and second player may play the round of the skill-based game against one another. A.7. The method of claim A, In which facilitating play of the round of the skill-based game includes: receiving indications of actions taken by the first player in the round of the skill-based game and presenting the actions to the second player. A.8. The method of claim A, in which the luck-based game includes at least one of a slot game, and a casino game. A.9. The method of claim A, in which the skill-based game includes at least one of a first person shooter, a board game, and a strategy game. A.10. The method of claim A, in which the luck-based game includes a single player game and the skill-based game includes a multiplayer game.

B. A method comprising: facilitating, by a computing device, play of a first round of a luck-based game by a first player, in which outcomes of the luck based game are based on a random event determination; facilitating, by the computing device, play of a second round of the luck-based game by a second player, allocating to a jackpot, by the computing device, at least one of: a portion of each of a first wager by the first player in the first round and a second wager by the second player in the second round and winnings of the first player from the first round and the second player from the second round, determining, by the computing device, an outcome of the first round and an outcome of the second round based on respective random event determinations; determining, by the computing device, that play of the first round results in a community outcome related to a plurality of players of the luck-based game, in which the plurality of players includes the first player and the second player; determining, by the computing device, that the plurality of players are qualified to play a skill-based game based on the community outcome, in which outcomes of the skill-based game are based on skill of players playing the skill-based game; facilitating, by the computing device, play of a round of a tournament of the skill-based game by the first player and the second player in response to the determination that play of the first round results in the community outcome, in which the round includes a round played by the first player against the second player; determining, by the computing device, a winner of the round of the skill-based game from among the first player and second player based on skill of each of the first player and the second player exercised in play of the round of the skill-based game;

facilitating, by the computing device, play of a second round of the tournament of the skill-based game by the winner against a third player; and awarding, by the computing device, at least a part of the jackpot to a tournament winner of the tournament.

B.1. The method of claim B, further comprising: allocating at least a portion of a third wager by the third player in a third round of the luck-based game to the jackpot. B.2. The method of claim B, In which the skill-based game includes a game in which outcomes of the game are not based on a random event. B.3. The method of claim B, In which facilitating play of the first round includes presenting an interface through which the first player may play the luck-based game. B.4. The method of claim B, In which facilitating play of the round of the skill-based game includes: determining that the first and second players are ready to play the round of the skill-based game. B.5. The method of claim B, In which facilitating play of the round of the skill-based game includes: matching the first and second player together for play of the round of the skill-based game. B.5.1. The method of claim B.5, in which matching includes matching based on location of each of the first and second player being in a same casino that is different from the third player.

B.6. The method of claim B, In which facilitating play of the round of the skill-based game includes: providing an interface to each of the first and second player through which each of the first and second player may play the round of the skill-based game against one another. B.7. The method of claim B, In which facilitating play of the round of the skill-based game includes: receiving indications of actions taken by the first player in the round of the skill-based game and presenting the actions to the second player. B.8. The method of claim B, in which the luck-based game includes at least one of a slot game, and a casino game. B.9. The method of claim B, in which the skill-based game includes at least one of a first person shooter, a board game, and a strategy game. B.10. The method of claim B, in which the luck-based game includes a single player game and the skill-based game includes a multiplayer game.

DETAILED DESCRIPTION

Figure 1:
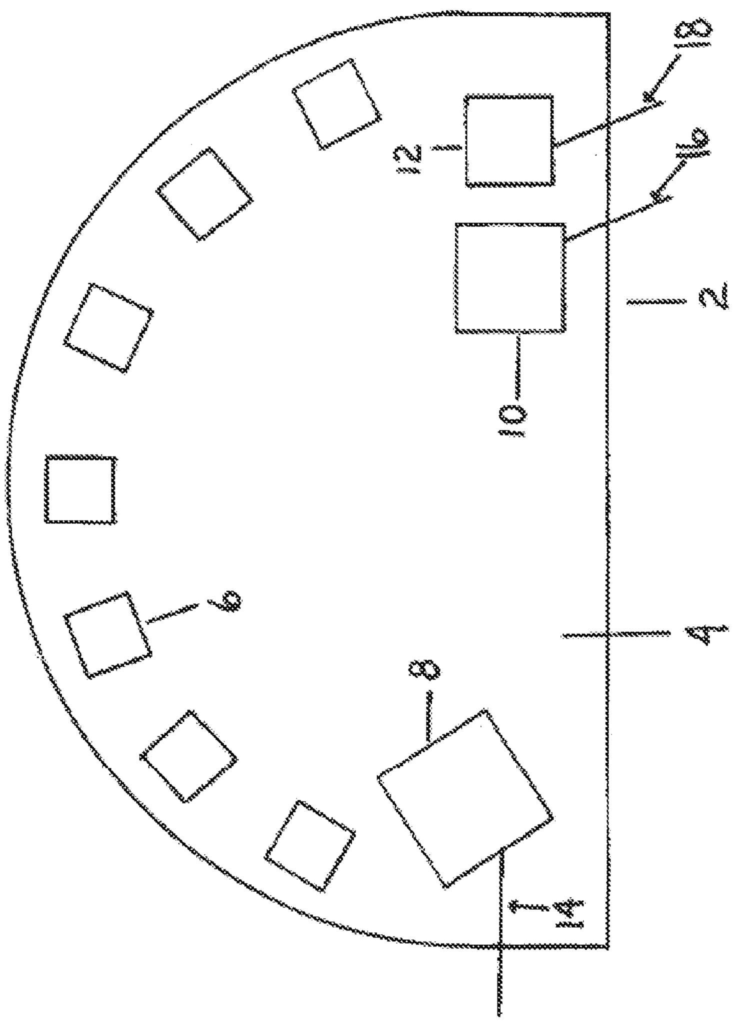
FIG. 1 shows a block diagram of a hand-reading system of some embodiments.

The following sections I-X provide a guide to interpreting the present application.

I. TERMS

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. DETERMINING

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. FORMS OF SENTENCES

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. DISCLOSED EXAMPLES AND TERMINOLOGY ARE NOT LIMITING

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. COMPUTING

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. CONTINUING APPLICATIONS

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, PARAGRAPH 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. DISCLAIMER

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

IX. INCORPORATION BY REFERENCE

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. PROSECUTION HISTORY

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. CARDS

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XII. RULES OF CARD GAMES

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, the cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw Poker

Players each receive five—as in five-card draw—or more cards, all of which are hidden. They can then replace one or more of these cards a certain number of times.

Stud Poker

Players receive cards one at a time, some being displayed to other players at the table. The key difference between stud and 'draw' poker is that players are not allowed to discard or replace any cards.

Community Card Poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight Flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples

10♣ 10♦ 10♥ 10♠ 5♦ ("four tens" or "quad tens") defeats 6♦ 6♥ 6♠ 6♣ K♠ ("four sixes" or "quad sixes") 10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3 6♣ 6, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♣ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♠ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♣ 4♣ 3♥ 2♥. The ace may not "wrap around", or play both high and low in the same hand: 3♣ 2♦ A♠ K♠ Q♣ is not a straight, but just ace-high no pair.

Examples

- 8♠ 7♠ 6♥ 5♥ 4♠ ("eight-high straight") defeats 6♦ 5♠ 4♦ 3♥ 2♣ ("six-high straight")
- 8♠ 7♠ 6♥ 5♥ 4♠ TIES 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples

- 8♠ 8♥ 8♦ 5♠ 3♣ ("three eights") defeats 5♣ 5♥ 5♦ Q♦ 10♣ ("three fives")
- 8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples

- K♥ K♦ 2♠ 2♦ J♥ ("kings up") defeats J♦ J♠ 10♠ 10♣ 9♠ ("jacks up")
- 9♣ 9♦ 7♦ 7♠ 6♥ ("nines and sevens") defeats 9♥ 9♠ 5♥ 5♦ K♣ ("nines and fives")
- 4♠ 4♣ 3♠ 3♥ K♦ ("fours and threes, king kicker") defeats 4♥ 4♦ 3♦ 3 10♣ ("fours and threes with a ten")

One Pair

One pair is a poker hand such as 4♥ 4♠ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples

- 10♣ 10♠ 6♠ 4♥ 2♥ ("pair of tens") defeats 9♥ 9♣ A♥ Q♦ 10♥ ("pair of nines")
- 10♥ 10♦ J♦ 3♥ 2♣ ("tens with jack kicker") defeats 10♣ 10♠ 6♠ 4♥ 2♥ ("tens with six kicker")
- 2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples

- A♦ 10♦ 9♠ 5♣ 4♣ ("ace high") defeats K♣ Q♦ J♣ 8♥ 7♥ ("king high")
- A♣ Q♣ 7♦ 5♥ 2♣ ("ace-queen") defeats A♦ 10♦ 9♠ 5♣ 4♣ ("ace-ten")
- 7♠ 6♣ 5♣ 4♥ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that may qualify. As the dealer's hand is partially concealed during play (usually only one card, at most) is displayed to the player before player wagering is complete), the player may always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer may hit until he has a point total of at least 17, regardless of what the players have. In most casinos, the dealer may also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural' (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIII. TRACKING THE ACTION AT A TABLE

U.S. Pat. No. 6,579,181 generally describes, "a system for automatically monitoring playing and wagering of a game. In one illustrated embodiment, the system includes a card deck reader that automatically reads a respective symbol from each card in a deck of cards before a first one of the cards is removed from the deck. The symbol identifies a value of the card in terms of rank and suit, and can take the form of a machine-readable symbol, such as a bar code, area or matrix code or stacked code. In another aspect, the system does not decode the read symbol until the respective card is dealt, to ensure security.

"In another aspect, the system can include a chip tray reader that automatically images the contents of a chip tray. The system periodically determines the number and value of chips in the chip tray from the image, and compares the change in contents of the chip tray to the outcome of game play to verify that the proper amounts have been paid out and collected.

"In a further aspect, the system can include a table monitor that automatically images the activity or events occurring at a gaming table. The system periodically compares images of the gaming table to identify wagering, as well as the appearance, removal and position of cards and/or other objects on the gaming table. The table monitoring system can be unobtrusively located in the chip tray."

U.S. Pat. No. 6,579,181 generally describes "a drop box that automatically verifies an amount and authenticity of a deposit and reconciles the deposit with a change in the contents of the chip tray. The drop box can image different portions of the deposited item, selecting appropriate lighting and resolutions to examine security features in the deposited item.

"In another aspect, the system can employ some, or all of the components to monitor the gaming habits of players and the performance of employees. The system can detect suspect playing and wagering patterns that may be prohibited. The system can also identify the win/loss percentage of the players and the dealer, as well as a number of other statistically relevant measures. Such measures can provide a casino or other gaming establishment with enhanced automated security, and automated real-time accounting. The measures can additionally provide a basis for automatically allocating complimentary benefits to the players."

Various embodiments include an apparatus, method and system which utilizes a card dispensing shoe with scanner and its associated software which enable the card dealer when dealing the game from a card dispensing shoe with scanner preferably placed on a game table where the twenty-one game to be evaluated by the software is being played, to use one or more keyboard(s) and/or LCD displays coupled to the shoe to identify for the computer program the number of the active players' seats, or active players, including the dealer's position relative thereto and their active play at the game table during each game round dealt from the shoe. These keyboards and LCD displays are also used to enter other data relevant to each seat's, or player's, betting and/or decision strategies for each hand played. The data is analyzed by a computer software program designed to evaluate the strategy decisions and betting skills of casino twenty-one, or blackjack players playing the game of blackjack during real time. The evaluation software is coupled to a central processing unit (CPU) or host computer that is also coupled to the shoe's keyboard(s) and LCD displays. The dealer using one or more keyboard(s) attached to or carried by the shoe, or a keyboard(s) located near the dealer is able to see and record the exact amount bet by each player for each hand played for the game to be evaluated. The optical scanner coupled to the CPU reads the value of each card dealt to each player's hand(s) and the dealer's hand as each card is dealt to a specific hand, seat or position and converts the game card value of each card dealt from the shoe to the players and the dealer of the game to a card count system value for one or more card count systems programmed into the evaluation software. The CPU also records each player's decision(s) to hit a hand, and the dealer's decision to hit or take another card when required by the rules of the game, as the hit card is removed from the shoe. The dealer uses one or more of the keyboards and LCD displays carried by the shoe to record each player's decision(s) to Insure, Surrender, Stand, Double Down, or Split a hand. When the dealer has an Ace or a Ten as an up-card, he/she may use one or more of the keyboards to prompt the computer system's software, since the dealer's second card, or hole-card, which is dealt face down, has been scanned and the game card value thereof has been imported into the computer systems software, to instantly inform the dealer, by means of one or more of the shoe's LCDs, if his/her game cards, or hand total, constitutes a two-card "21" or "Blackjack".

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe, for evaluating information relative to each players received playing cards and their values with information as to playing tactics used by each player relative to the values of the received playing cards, and for combining all of this information for identifying each player's playing strategy, and a playing table coupled to the card delivery shoe apparatus and having at least one keypad means located thereon for permitting at least one player to select various card playing options to wager upon.

In various embodiments, a card playing system for playing a card game which includes a card delivery shoe apparatus for use in dealing playing cards to at least one player for the playing of the card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying such of the playing cards received by each player from the shoe apparatus, for evaluating information relative to each player's received playing cards and their values with information as to betting tactics used by each player relative to playing cards previously dealt out from the shoe apparatus providing card count information, and for combining all of this information for identifying each player's card count strategy, and a playing table coupled to the card delivery shoe apparatus and having at least one keypad means located thereon for permitting the at least one player to select at least one of various card playing options to wager upon.

In various embodiments, a card playing system for playing a card game which includes a card delivery shoe apparatus for use in dealing playing cards to at least one player for the playing of a card game comprises, in combination, housing means having a chute for supporting at least one deck of playing cards for permitting movement of the playing cards one at a time through the chute, the housing means having an outlet opening that permits the playing cards of the deck to be moved one-by-one out of the housing means during the play of a card game, card scanning means located within the housing means for scanning indicia located on each of the playing cards as each of the playing cards are moved out from the chute of the housing means, means for receiving the output of the card scanning means for identifying each of the playing cards received by each player from the shoe apparatus, for evaluating information relative to each player's received playing cards and their values with information as to playing tactics used by each player relative to the values of the received playing cards, for combining use of all of this information for identifying each player's playing strategy, and for also identifying each player's card count strategy based on each player's betting tactics used by each player relative to playing cards previously dealt out from the shoe apparatus providing card count information, and a playing table coupled to the card delivery shoe apparatus and having at least one keypad means located thereon for permitting the at least one player to select at least one of various card playing options to wager upon.

In various embodiments, a secure game table system, adapted for multiple sites under a central control, allows for the monitoring of hands in a progressive live card game. A live card game has at least one deck, with each deck having a predetermined number of cards. Each game table in the system has a plurality of player positions with or without players at each position and a dealer at a dealer position.

In one embodiment, for providing additional security, a common identity code is located on each of the cards in each deck. Each deck has a different common identity code. A shuffler is used to shuffle the decks together and the shuffler has a circuit for counting of the cards from a previous hand that are inserted into the shuffler for reshuffling. The shuffler circuit counts each card inserted and reads the common identity code located on each card. The shuffler circuit issues a signal corresponding to the count and the common identity code read. The game control (e.g., the computer) located at each table receives this signal from the shuffler circuit and verifies that no cards have been withdrawn from the hand by a player (or the dealer) or that no new cards have been substituted. If the count is not proper or if a game card lacks an identity code or an identity code is mismatched, an alarm signal is generated indicating that a new deck of cards needs to be used and that the possibility of a breach in the security of the game has occurred.

In yet another embodiment of security, a unique code, such as a bar code, is placed on each card and as each card is dealt by the dealer from a shoe, a detector reads the code and issues a signal to the game control containing at least the value and the suit of each card dealt in the hand. The detector may also read a common identity deck code and issue that as a signal to the game control. The shoe may have an optical scanner for generating an image of each card as it is dealt from the shoe by the dealer in a hand. The game control stores this information in a memory so that a history of each card dealt from the shoe in a hand is recorded.

In yet another embodiment of security, an integrated shuffler/shoe obtains an optical image of each card dealt from the shoe for a hand and for each card inserted into the shuffler after a hand. These images are delivered to the game control where the images are counted and compared. When an irregular count or comparison occurs, an alarm is raised. The shuffler and shoe are integrated to provide security between the two units.

In another embodiment of security for a live card game, a game bet sensor is located near each of the plurality of player positions for sensing the presence of a game bet. The game bet sensor issues a signal counting the tokens placed. It is entirely possible that game bet sensors at some player positions do not have bets, and therefore, the game control that is receptive of these signals identifies which player positions have players placing game bets. This information is stored in memory and becomes part of the history of the game.

In another embodiment of security, a progressive bet sensor is located at each of the plurality of player positions and senses the presence of a progressive bet. The progressive bet sensor issues a signal that is received by the game control, which records in memory the progressive bets being placed at the respective player position sensed. If a progressive bet is sensed and a game bet is not, the game control issues an alarm signal indicating improper betting. At this point, the game control knows the identity of each player location having placed a game bet and, of those player positions having game bets placed, which player positions also have a progressive bet. This is stored in memory as part of the history of the hand.

In yet another embodiment of security, a card sensor is located near each player position and the dealer position. The card sensor issues a signal for each card received at the card sensor. The game control receives this issued signal and correlates those player positions having placed a game bet with the received cards. In the event a player position without a game bet receives a card or a player position with a game bet receives a card out of sequence, the game control issues an alarm. This information is added to the history of the game in memory, and the history contains the value and suit of each card delivered to each player position having a game bet.

A progressive jackpot display may be located at each game table and may display one or more jackpot awards for one or more winning combinations of cards. In one embodiment of the present invention, the game control at each table has stored in memory the winning combinations necessary to win the progressive jackpots. Since the game control accurately stores the suit and value of each card received at a particular player position, the game control can automatically detect a winning combination and issue an award signal for that player position. The dealer can then verify that that player at that position indeed has the correct combination of cards. The game control continuously updates the central control interconnected to all other game tables so that the central control can then inform all game tables of this win including, if desirable, the name of the winner and the amount won.

The central control communicates continuously with each game control and its associated progressive jackpot display may receive over a communication link all or part of the information stored in each game control.

Various embodiments include a card shoe with a device for automatic recognition and tracking of the value of each gaming card drawn out of the card shoe in a covered way (face down).

Various embodiments include a gaming table with a device for automatic recognition of played or not played boxes (hands), whereby it has to realize multiple bets on each hand and the use of insurance lines. Furthermore, the gaming table may include a device to recognize automatically the number of cards placed in front of each player and the dealer.

Various embodiments include the recognition, tracking, and storage of gaming chips.

In various embodiment, an electronic data processing (EDP) program may process the value of all bets on each box and associated insurance line, control the sequence of delivery of the cards, control the distribution of the gaming cards to each player and the dealer, may calculate and compare the total score of each hand and the dealer's, and may evaluate the players' wins.

Gaming data may then be processed by means of the EDP program and shown simultaneously to the actual game at a special monitor or display. Same data may be recalled later on to monitor the total results whenever requested.

Various embodiments include a gaming table and a gaming table cloth arranged on the gaming table, the gaming table cloth provided with betting boxes and areas designated for placement of the gaming chips and other areas designated for placement of the playing cards, a card shoe for storage of one or more decks of playing cards, this card shoe including means for drawing individual ones of the playing cards face down so that a card value imprint on the drawn card is not visible to a player of the game of chance, a card recognition means for recognizing this card value imprint on the drawn card from the card shoe, this card recognition means being located in the card shoe, an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively, a gaming bet detector for automatic recognition or manual input of gaming bets, and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to various embodiments, the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus may includes automatic means for discriminating colored markings or regions on the chips and for producing a bet output signal in accordance with the colored markings or regions and the number of chips having identical colored markings or regions.

The gaming bet detector may include automatic means for discriminating between chips of different value in the game of chance and means for producing a bet output signal in accordance with the different values of the chips when the chips are bet by a player. In various embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

XIV. FOLLOWING THE BETS

Various embodiments include a smart card delivery shoe that reads the suit and rank of each card before it is delivered to the various positions where cards are to be dealt in the play of the casino table card game. The cards are then dealt according to the rules of the game to the required card positions. Different games have diverse card distribution positions, different card numbers, and different delivery sequences that the hand identifying system of some embodiments of the invention may encompass. For example, in the most complex of card distribution games of blackjack, cards are usually dealt one at a time in sequence around a table, one card at a time to each player position and then to the dealer position. The one card at a time delivery sequence is again repeated so that each player position and the dealer position have an initial hand of exactly two cards. Complexity in hand development is introduced because players have essentially unlimited control over additional cards until point value in a hand exceeds a count of twenty-one. Players may stand with a count of 2 (two aces) or take a hit with a count of 21 if they are so inclined, so the knowledge of the count of a hand is no assurance of what a player will do. The dealer, on the other hand, is required to follow strict house rules on the play of the game according to the value of the dealer's hand. Small variances such as allowing or disallowing a hit on a "soft" seventeen count (e.g., an Ace and a 6) may exist, but the rules are otherwise very precise so that the house or dealer cannot exercise any strategy.

Other cards games may provide equal numbers of cards in batches. Variants of stud poker played against a dealer, for example, would usually provide hands of five cards, five at a time to each player position and if competing against a dealer, to the dealer position. This card hand distribution is quite simple to track as each sequence of five cards removed from the dealer shoe is a hand.

Other games may require cards to be dealt to players and other cards dealt to a flop or common card area. The system may also be programmable to cover this alternative if it is so desired.

Baccarat is closer to blackjack in card sequence of dealing, but has more rigid rules as to when hits may be taken by the player and the dealer, and each position may take a maximum of one card as a hit. The hand identification system of some embodiments of the invention may be able to address the needs of identifying hands in each of these types of games and especially may be able to identify hands in the a complex situation, the play of blackjack.

In various embodiments, where cameras are used to read cards, the light sensitive system may be any image capture system, digital or analog, that is capable of identifying the suit and rank of a card.

In various embodiments, a first step in the operation is to provide a set of cards to the smart delivery shoe, the cards being those cards that are going to be used in the play of a casino table card game. The set of cards (usually one or more decks) is provided in an already randomized set, being taken out of a shuffler or having been shuffled by hand. A smart delivery shoe is described in U.S. patent application Ser. No. 10/622,321, titled SMART DELIVERY SHOE, which application is incorporated herein in its entirety by reference. Some delivery systems or shoes with reading capability include, but are not limited to those disclosed in U.S. Pat. Nos. 4,750,743; 5,779,546; 5,605,334; 6,361,044; 6,217,447; 5,941,769; 6,229,536; 6,460,848; 5,722,893; 6,039,650; and 6,126,166. In various embodiments, the cards are read in the smart card delivery shoe, such as one card at a time in sequence. Reading cards by edge markings and special codes (as in U.S. Pat. No. 6,460,848) may require special encoding and marking of the cards. The entire sequence of cards in the set of cards may thus be determined and stored in memory. Memory may be at least in part in the smart delivery shoe, but communication with a central processor is possible. The sequence would then also or solely be stored in the central computer.

In various embodiments, the cards are then dealt out of the smart delivery shoe, the delivery shoe registering how many cards are removed one-at-a-time. This may be accomplished by the above identified U.S. patent application Ser. No. 10/622,321 where cards are fed to the dealer removal area one at a time, so only one card can be removed by the dealer. As each card is removed, a signal is created indicating that a specific card (of rank and suit) has been dealt. The computer and system knows only that a first card has been dealt, and it is presumed to go to the first player. The remaining cards are dealt out to players and dealer. In the play of certain games (e.g., stud variants) where specific numbers of cards are known to be dealt to each position, the shoe may be programmed with the number of players at any time, so hands can be correlated even before they have been dealt. If the shoe is playing a stud variant where each player and the dealer gets three cards (Three Card Poker™ game), the system may know in advance of the deal what each player and the dealer will have as a hand. It is also possible that there be a signal available when the dealer has received either his first card (e.g., when cards are dealt in sequence, one-at-a-time) or has received his entire hand. The signal may be used to automatically determine the number of player positions active on the table at any given time. For example, if in a hand of blackjack the dealer receives the sixth card, the system may immediately know that there are five players at the table. The signal can be given manually (pressing a button at the dealer position or on the smart card delivery shoe) or can be provided automatically (a card presence sensor at the dealer's position, where a card can be placed over the sensor to provide a signal). Where an automatic signal is provided by a sensor, some physical protection of the sensor may be provided, such as a shield that would prevent accidental contact with the sensor or blockage of the sensor. An L-shaped cover may be used so a card could be slid under the arm of the L parallel to the table surface and cover the sensor under that branch of the L. The signal can also be given after all cards for the hand have been delivered, again indicating the number of players, For example, when the dealer's two cards are slid under the L-shaped cover to block or contact the sensor, the system may know the total number of cards dealt on the hand (e.g., 10 cards), know that the dealer has 2 cards, determine that players therefore have 8 cards, and know that each player has 2 cards each, thereby absolutely determining that there are four active player positions at the table (10−2=8 and then 8/2=4 players). This automatic determination may serve as an alternative to having dealers input the number of players each hand at a table or having to manually change the indicated number of players at a table each time the number changes.

Once all active positions have been dealt to, the system may now know what cards are initially present in each player's hand, the dealer's hand, and any flop or common hand. The system operation may now be simple when no more cards are provided to play the casino table game. All hands may then be known and all outcomes may be predicted. The complication of additional cards will be addressed with respect to the game of blackjack.

After dealing the initial set of two cards per hand, the system may not immediately know where each remaining card will be dealt. The system may know what cards are dealt, however. It is with this knowledge and a subsequent identification of discarded hands that the hands and cards from the smart delivery shoe can be reconciled or verified. Each hand is already identified by the presence of two specifically known cards. Hands are then played according to the rules of the game, and hands are discarded when play of a hand is exhausted. A hand is exhausted when 1) there is a blackjack, the hand is paid, and the cards are cleared; 2) a hand breaks with a count over twenty-one and the cards are cleared; and/or a round of the game is played to a conclusion, the dealer's hand completed, all wagers are settled, and the cards are cleared. As is typically done in a casino to enable reconciling of hands manually, cards are picked up in a precise order from the table. The cards are usually cleared from the dealer's right to the dealer's left, and the cards at each position comprise the cards in the order that they were delivered, first card on the bottom, second card over the first card, third card over the second card, etc. maintaining the order or a close approximation of the order (e.g., the first two cards may be reversed) is important as the first two cards form an anchor, focus, basis, fence, end point or set edge for each hand. For example, if the third player position was known to have received the 10 of hearts (10H) and the 9 of spades (9S) for the first two card, and the fourth player was known to receive the 8 of diamonds (8D) and the 3 of clubs (3C) for the first two cards, the edges or anchors of the two hands are 9S/10H and 8D/3C. When the hands are swept at the conclusion of the game, the cards are sent to a smart discard rack (e.g., see U.S. patent application Ser. No. 10/622,388, which application is incorporated herein by reference in its entirety) and the hand with the 9S/10H was not already exhausted (e.g., broken or busted) and the swept cards consist of 9S, 10H, 8S, 8D and 3C (as read by the smart discard rack), the software of the processor may automatically know that the final hands in the third and fourth positions were a count of 19 (9S and 10H) for the third hand and 19 (8D and 3C originally plus the 8S hit) for the fourth hand. The analysis by the software specifically identifies the fourth hand as a count of 19 with the specific cards read by the smart discard shoe. The information from reading that now exhausted hand is compared with the original information collected from the smart delivery shoe. The smart delivery shoe information when combined with the smart discard rack information shall confirm the hands in each position, even though cards were not uniformly distributed (e.g., player one takes two hits for a total of four cards, player two takes three hits for a total of five cards, player three takes no hit for a total of two cards, player four takes one hit for a total of three cards, and the dealer takes two hits for a total of four cards).

The dealer's cards may be equally susceptible to analysis in a number of different formats. After the last card has been dealt to the last player, a signal may be easily and imperceptibly generated that the dealer's hand will now become active with possible hits. For example, with the sensor described above for sensing the presence of the first dealer card or the completion of the dealer's hand, the cards would be removed from beneath the L-shaped protective bridge. This type of movement is ordinarily done in blackjack where the dealer has at most a single card exposed and one card buried face down. In this case, the removal of the cards from over the sensor underneath the L-cover to display the hole card is a natural movement and then exposes the sensor. This can provide a signal to the central processor that the dealer's hand will be receiving all additional cards in that round of the game. The system at this point knows the two initial cards in the dealer's hand, knows the values of the next sequence of cards, and knows the rules by which a dealer may play. The system knows what cards the dealer will receive and what the final total of the dealer's hand will be because the dealer has no freedom of decision or movement in the play of the dealer's hand. When the dealer's hand is placed into the smart discard rack, the discard rack already knows the specifics of the dealer's hand even without having to use the first two cards as an anchor or basis for the dealer's hand. The cards may be treated in this manner in some embodiments.

When the hands are swept from the table, dealer's hand then players' hands from right to left (from the dealer's position or vice-versa if that is the manner of house play), the smart discard rack reads the shoes, identifies the anchors for each hand, knows that no hands swept at the conclusion can exceed a count of twenty-one, and the computer identifies the individual hands and reconciles them with the original data from the smart delivery shoe. The system thereby can identify each hand played and provide system assurance that the hand was played fairly and accurately.

If a lack of reconciling by the system occurs, a number of events can occur. A signal can be given directly to the dealer position, to the pit area, or to a security zone and the cards examined to determine the nature and cause of the error and inspect individual cards if necessary. When the hand and card data is being used for various statistical purposes, such as evaluating dealer efficiency, dealer win/loss events, player efficiency, player win/loss events, statistical habits of players, unusual play tactics or meaningful play tactics (e.g., indicative of card counting), and the like, the system may file the particular hand in a 'dump' file so that hand is not used in the statistical analysis, this is to assure that maximum benefits of the analysis are not tilted by erroneous or anomalous data.

Various embodiments may include date stamping of each card dealt (actual time and date defining sequence, with concept of specific identification of sequence identifier possibly being unique). The date stamping may also be replaced by specific sequence stamping or marking, such as a specific hand number, at a specific table, at a specific casino, with a specific number of players, etc. The records could indicate variations of indicators in the stored memory of the central computer of Lucky 777 Casino, Aug. 19, 1995, 8:12:17 a.m., Table 3, position 3, hand 7S/4D/9S, or simply identify something similar by alphanumeric code as L7C-819-95-3-3-073-7S/4D/9S (073 being the 73$^{rd}$ hand dealt). This date stamping of hands or even cards in memory can be used as an analytical search tool for security and to enhance hand identification.

FIG. 1 shows a block diagram of the minimum components for the hand-reading system on a table 4 of some embodiments, a smart card-reading delivery shoe 8 with output 14 and a smart card-reading discard rack 12 with output 18. Player positions 6 are shown, as is a dealer's hand position sensor 10 without output port 16.

The use of the discard rack acting to reconcile hands returned to the discard rack out-of-order (e.g., blackjack or bust) automatically may be advantageous, in some embodiments. The software as described above can be programmed to recognize hands removed out-of-dealing order on the basis of knowledge of the anchor cards (the first two cards) known to have been dealt to a specific hand. For example, the software will identify that when a blackjack was dealt to position three, that hand will be removed, the feed of the third hand into the smart card discard tray confirms this, and position three will essentially be ignored in future hand resolution. More importantly, when the anchor cards were, for example, 9S/5C in the second player position and an exhausted hand of 8D/9S/5C is placed into the smart discard rack, that hand will be identified as the hand from the second player position. If two identical hands happen to be dealt in the same round of play, the software will merely be alerted (it knows all of the hands) to specifically check the final order of cards placed into the smart discard rack to more carefully position the location of that exhausted hand. This is merely recognition software implementation once the concept is understood.

That the step of removal of cards from the dealer's sensor or other initiated signal identifies that all further cards are going to the dealer may be useful in defining the edges of play between rounds and in identifying the dealer's hand and the end of a round of play. When the dealer's cards are deposited and read in the smart discard rack, the central computer knows that another round of play is to occur and a mark or note may be established that the following sequence will be a new round and the analytical cycle may begin all over again.

The discard rack indicates that a complete hand has been delivered by absence of additional cards in the Discard Rack in-feed tray. When cards are swept from an early exhausted hand (blackjack or a break), they are swept one at a time and inserted into the smart discard rack one at a time. When the smart discard rack in-feed tray is empty, the system understands that a complete hand has been identified, and the system can reconcile that specific hand with the information from the smart delivery shoe. The system can be hooked-up to feed strategy analysis software programs such as the SMI licensed proprietary Bloodhound™ analysis program.

Various embodiments include a casino or card room game modified to include a progressive jackpot component. During the play of a Twenty-One game, for example, in addition to this normal wager, a player will have the option of making an additional wager that becomes part of, and makes the player eligible to win, the progressive jackpot. If the player's Twenty-One hand comprises a particular, predetermined arrangement of cards, the player will win all, or part of, the amount showing on the progressive jackpot. This progressive jackpot feature is also adaptable to any other casino or card room game such as Draw Poker, Stud Poker, Lo-Ball Poker or Caribbean Stud™ Poker. Various embodiments include a gaming table, such as those used for Twenty-One or poker, modified with the addition of a coin acceptor that is electronically connected to a progressive jackpot meter. When player drops a coin into the coin acceptor, a light is activated at the player's location indicating that he is participating in the progressive jackpot component of the game during that hand. At the same time, a signal from the coin acceptor is sent to the progressive meter to increment the amount shown on the progressive meter. At the conclusion of the play of each hand, the coin acceptor is reset for the next hand. When a player wins all or part of the progressive jackpot, the amount showing on the progressive jackpot meter is reduced by the amount won by the player. Any number of gaming tables can be connected to a single progressive jackpot meter.

XV. CARD SHUFFLERS

Various embodiments include an automatic card shuffler, including a card mixer for receiving cards to be shuffled in first and second trays. Sensors detect the presence of cards in these trays to automatically initiate a shuffling operation, in which the cards are conveyed from the trays to a card mixer, which randomly interleaves the cards delivered to the mixing mechanism and deposits the interleaved cards in a vertically aligned card compartment.

A carriage supporting an ejector is reciprocated back and forth in a vertical direction by a reversible linear drive while the cards are being mixed, to constantly move the card ejector along the card receiving compartment. The reversible linear drive is preferably activated upon activation of the mixing means and operates simultaneously with, but independently of, the mixing means. When the shuffling operation is terminated, the linear drive is deactivated thereby randomly positioning the card ejector at a vertical location along the card receiving compartment.

A sensor arranged within the card receiving compartment determines if the stack of cards has reached at least a predetermined vertical height. After the card ejector has stopped and, if the sensor in the compartment determines that the stack of cards has reached at least the aforesaid predetermined height, a mechanism including a motor drive, is activated to move the wedge-shaped card ejector into the card receiving compartment for ejecting a group of the cards in the stack, the group selected being determined by the vertical position attained by the wedge-shaped card ejector.

In various embodiments, the card ejector pushes the group of cards engaged by the ejector outwardly through the forward open end of the compartment, said group of cards being displaced from the remaining cards of the stack, but not being completely or fully ejected from the stack.

The card ejector, upon reaching the end of its ejection stroke, detected by a microswitch, is withdrawn from the card compartment and returned to its initial position in readiness for a subsequent shuffling and card selecting operation.

In various embodiments, a technique for randomly selecting the group of cards to be ejected from the card compartment utilizes solid state electronic circuit means, which may comprise either a group of discrete solid state circuits or a microprocessor, either of which techniques preferably employ a high frequency generator for stepping a N-stage counter during the shuffling operation. When the shuffling operation is completed, the stepping of the counter is terminated. The output of the counter is converted to a DC signal, which is compared against another DC signal representative of the vertical location of the card ejector along the card compartment.

In various embodiments, a random selection is made by incrementing the N-stage counter with a high frequency generator. The high frequency generator is disconnected from the N-stage counter upon termination of the shuffling operation. The N-stage counter is then incremented by a very low frequency generator until it reaches its capacity count and resets. The reciprocating movement of the card ejector is terminated after completion of a time interval of random length and extending from the time the high frequency generator is disconnected from the N-stage counter to the time that the counter is advanced to its capacity count and reset by the low frequency generator, triggering the energization of the reciprocating drive, at which time the card ejector carriage coasts to a stop.

In various embodiments, the card ejector partially ejects a group of cards from the stack in the compartment. The partially displaced group of cards is then manually removed from the compartment. In another preferred embodiment, the ejector fully ejects the group of cards from the compartment, the ejected cards being dropped into a chute, which delivers the cards directly to a dealing shoe. The pressure plate of the dealing shoe is initially withdrawn to a position enabling the cards passing through the delivery shoe to enter directly into the dealing shoe, and is thereafter returned to its original position at which it urges the cards towards the output end of the dealing shoe.

Various embodiments include a method and apparatus for automatically shuffling and cutting playing cards and delivering shuffled and cut playing cards to the dispensing shoe without any human intervention whatsoever once the playing cards are delivered to the shuffling apparatus. In addition, the shuffling operation may be performed as soon as the play of each game is completed, if desired, and simultaneously with the start of a new game, thus totally eliminating the need to shuffle all of the playing cards (which may include six or eight decks, for example) at one time. Preferably, the cards played are collected in a "dead box" and are drawn from the dead box when an adequate number of cards have been accumulated for shuffling and cutting using the method of the present invention.

Various embodiments include a computer controlled shuffling and cutting system provided with a housing having at least one transparent wall making the shuffling and card delivery mechanism easily visible to all players and floor management in casino applications. The housing is provided with a reciprocally slidable playing card pusher which, in the first position, is located outside of said housing. A motor-operated transparent door selectively seals and uncovers an opening in the transparent wall to permit the slidably mounted card pusher to be moved from its aforementioned first position to a second position inside the housing whereupon the slidably mounted card pusher is then withdrawn to the first position, whereupon the playing cards have been deposited upon a motorized platform which moves vertically and selectively in the upward and downward directions.

The motor driven transparent door is lifted to the uncovered position responsive to the proper location of the motor driven platform, detected by suitable sensor means, as well as depression of a foot or hand-operated button accessible to the dealer.

The motor driven platform (or "elevator") lifts the stack of playing cards deposited therein upwardly toward a shuffling mechanism responsive to removal of the slidably mounted card pusher and closure of the transparent door whereupon the playing cards are driven by the shuffling mechanism in opposing directions and away from the stack to first and second card holding magazines positioned on opposing sides of the elevator, said shuffling mechanism comprising motor driven rollers rotatable upon a reciprocating mounting device, the reciprocating speed and roller rotating speed being adjustable. Alternatively, however, the reciprocating and rotating speeds may be fixed; if desired, employing motors having fixed output speeds, in place of the stepper motors employed in one preferred embodiment.

Upon completion of a shuffling operation, the platform is lowered and the stacks of cards in each of the aforementioned receiving compartments are sequentially pushed back onto the moving elevator by suitable motor-driven pushing mechanisms. The order of operation of the pushing mechanisms is made random by use of a random numbers generator employed in the operating computer for controlling the system. These operations can be repeated, if desired. Typically, new cards undergo these operations from two to four times.

Guide assemblies guide the movement of cards onto the platform, prevent shuffled cards from being prematurely returned to the elevator platform and align the cards as they fall into the card receiving regions as well as when they are pushed back onto the elevator platform by the motor-driven pushing mechanism.

Upon completion of the plurality of shuffling and cutting operations, the platform is again lowered, causing the shuffled and cut cards to be moved downwardly toward a movable guide plate having an inclined guide surface.

As the motor driven elevator moves downwardly between the guide plates, the stack of cards engages the inclined guide surface of a substantially U-shaped secondary block member causing the stack to be shifted from a horizontal orientation to a diagonal orientation. Substantially simultaneously therewith, a "drawbridge-like" assembly comprised of a pair of swingable arms pivotally mounted at their lower ends, are swung downwardly about their pivot pin from a vertical orientation to a diagonal orientation and serve as a diagonally aligned guide path. The diagonally aligned stack of cards slides downwardly along the inclined guide surfaces and onto the draw bridge-like arms and are moved downwardly therealong by the U-shaped secondary block member, under control of a stepper motor, to move cards toward and ultimately into the dealing shoe.

A primary block, with a paddle, then moves between the cut-away portion of the U-shaped secondary block, thus applying forward pressure to the stack of cards. The secondary block then retracts to the home position. The paddle is substantially rectangular-shaped and is aligned in a diagonal orientation. Upon initial set-up of the system the paddle is positioned above the path of movement of cards into the dealing shoe. The secondary block moves the cut and shuffled cards into the dealing shoe and the paddle is lowered to the path of movement of cards toward the dealing shoe and is moved against the rearward most card in the stack of cards delivered to the dealing shoe. When shuffling and cutting operations are performed subsequent to the initial set-up, the paddle rests against the rearward most card previously delivered to the dealing shoe. The shuffled and cut cards sliding along the guide surfaces of the diagonally aligned arms of the draw bridge-like mechanism come to rest upon the opposite surface of the paddle which serves to isolate the playing cards previously delivered to the dispensing shoe, as well as providing a slight pushing force urging the cards toward the outlet slot of the dispensing shoe thereby enabling the shuffling and delivering operations to be performed simultaneously with the dispensing of playing cards from the dispensing shoe.

After all of the newly shuffled playing cards have been delivered to the rear end of the dispensing shoe, by means of the U-shaped secondary block the paddle which is sandwiched between two groups of playing cards, is lifted to a position above and displaced from the playing cards. A movable paddle mounting assembly is then moved rearwardly by a motor to place the paddle to the rear of the rearmost playing card just delivered to the dispensing shoe; and the paddle is lowered to its home position, whereupon the motor controlling movement of the paddle assembly is then deenergized enabling the rollingly-mounted assembly supporting the paddle to move diagonally downwardly as playing cards are dispensed from the dispensing shoe to provide a force which is sufficient to urge the playing cards forwardly toward the playing card dispensing slot of the dealing shoe. The force acting upon the paddle assembly is the combination of gravity and a force exerted upon the paddle assembly by a constant tension spring assembly. Jogging (i.e., “dither”) means cause the paddle to be jogged or reciprocated in opposing forward and rearward directions at periodic intervals to assure appropriate alignment, stacking and sliding movement of the stack of playing cards toward the card dispensing slot of the dealing shoe.

Upon completion of a game, the cards used in the completed game are typically collected by the dealer and placed in a dead box on the table. The collected cards are later placed within the reciprocally movable card pusher. The dealer has the option of inserting the cards within the reciprocally slidable card pusher into the shuffling mechanism or, alternatively, and preferably, may postpone a shuffling operation until a greater number of cards have been collected upon the reciprocally slidable card pusher. The shuffling and delivery operations may be performed as often or as infrequently as the dealer or casino management may choose. The shuffling and playing card delivery operations are fully automatic and are performed without human intervention as soon as cards are inserted within the machine on the elevator platform. The cards are always within the unobstructed view of the players to enable the players, as well as the dealer, to observe and thereby be assured that the shuffling, cutting and card delivery operations are being performed properly and without jamming and that the equipment is working properly as well. The shuffling and card delivery operations do not conflict or interfere with the dispensing of cards from the dispensing shoe, thereby permitting these operations to be performed substantially simultaneously, thus significantly reducing the amount of time devoted to shuffling and thereby greatly increasing the playing time, as well as providing a highly efficient random shuffling and cutting mechanism.

The system may be controlled by a microcomputer programmed to control the operations of the card shuffling and cutting system. The computer controls stepper motors through motor drive circuits, intelligent controllers and an opto-isolator linking the intelligent controllers to the computer. The computer also monitors a plurality of sensors to assure proper operation of each of the mechanisms of the system.

XVI. CASINO COUNTERMEASURES

Some methods of thwarting card counters include using a large number of decks. Shoes containing 6 or 8 decks are common. The more cards there are, the less variation there is in the proportions of the remaining cards and the harder it is to count them. The player’s advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XVII. VIDEO WAGERING GAMES

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine’s computer and the player is awarded either play credits or a coin payout as determined from a payoff table. This payoff table is stored in the machine’s computer memory and is also displayed on the machine’s screen. Hands with higher poker values are awarded more credits or coins. Very rare poker hands are awarded payoffs of 800-to-1 or higher.

XVIII. APPARATUS FOR PLAYING OVER A COMMUNICATIONS SYSTEM

Figure 2:
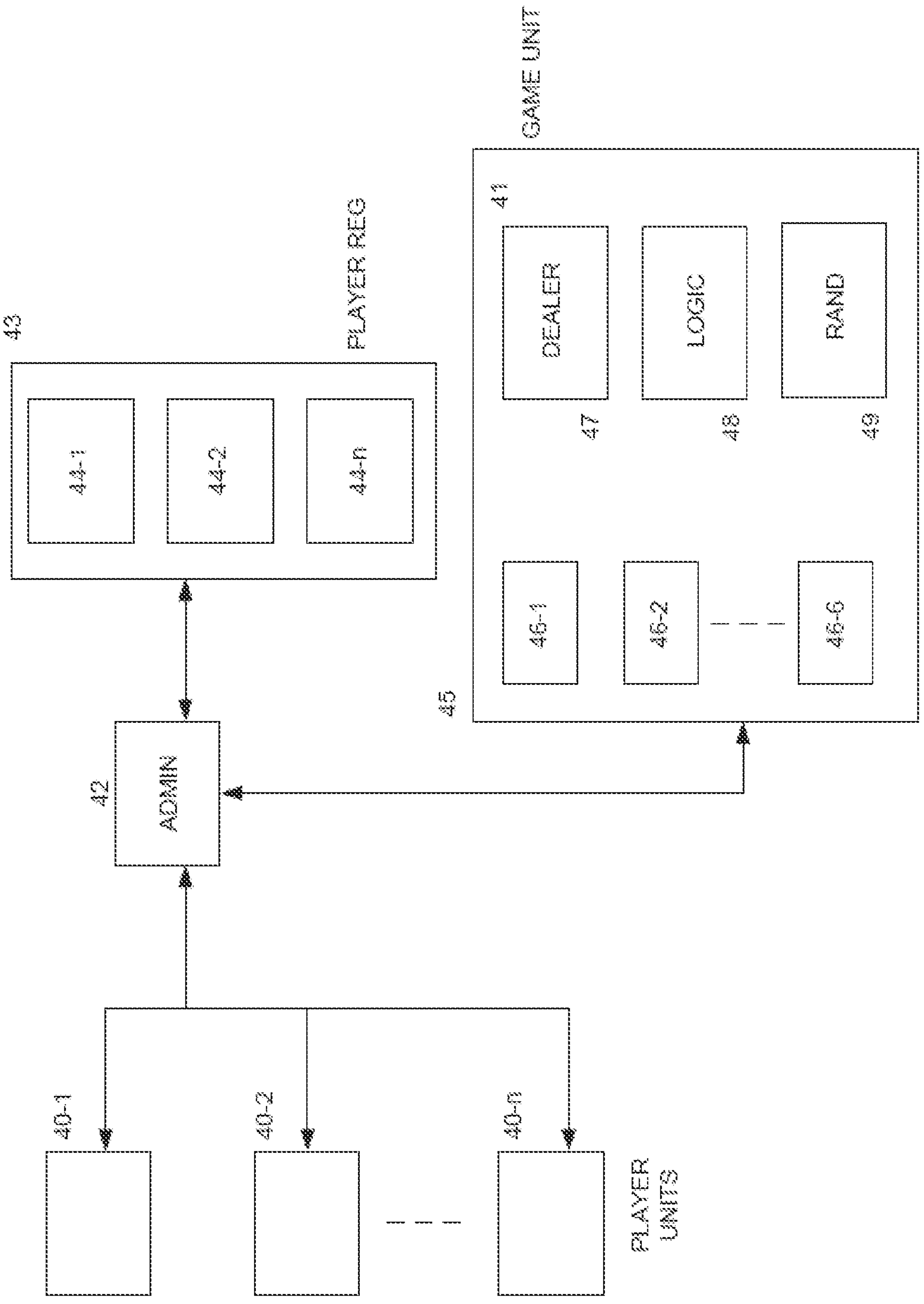
FIG. 2 shows apparatus for playing a game in some embodiments.

FIG. 2 shows apparatus for playing the game. There is a plurality of player units 40-1 to **40-*n* which are coupled via a communication system 41, such as the Internet, with a game playing system comprising an administration unit 42, a player register 43, and a game unit 45. Each unit 40** is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XIX. ALTERNATIVE TECHNOLOGIES

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XX. REFERENCES

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, 7,137,629, U.S. patent application Ser. No. 11/063,311.

XXI. EXAMPLE EMBODIMENTS

Some embodiments may include one or more users playing one or more first games. Based on an event (e.g., a community bonus round being triggered, a bonus round outcome occurring) related to such game play, one or more users may be qualified to play one or more second games (e.g., a bonus round, a skill based game, a tournament). Based on play of such one or more second games, one or more users may be awarded a prize (e.g., a jackpot amount, a win of a wager, a progressive prize).

Some embodiments may include one or more first games (e.g., luck based games, games with an outcome based on a random number generation, slot machines, card games, casino games, skill based games, computer games, live games) and/or one or more game machines (e.g., computing devices that may facilitate play of games, slot machines, servers, mobile devices, laptops, tables, card readers, and so on). In some embodiments, a first game may include a luck based game. Some example luck based games do not include skill, and/or include minimal skill. Some example luck based games include outcomes that are based on the results of a random event determination such as a generation of a random number, a selection of a random game indicia (e.g., card), and/or other random events. Some example luck based games may include a slot machine game, a bingo game, a roulette game, a craps game, a video card game, and so on.

In some embodiments, a game machine that may enable play of such a first game may include a server based gaming device, a client device, a standalone gaming device, and so on. Some example devices may include gaming servers, client devices, computing devices, mobile devices, iPhones, iPads, tablet computers, cell phones, processors, blades, devices in a computing cloud, laptops, slot machines, kiosks, card readers, tables, interactive table game devices, surface computers, and so on. For example, in some embodiments, a mobile device may allow play of a first game. The mobile device may receive information about the play of the game (e.g., random events, outcomes) from a server that generates such information. The mobile device may display information about such information and enable input to play such games. In other embodiments, a mobile device may produce outcomes and enable play without input from a server device.

Some embodiments may include one or more wagers and/or requests to play a first game. For example, a first player may begin play of a first game through a gaming device by placing a wager in the first game and/or otherwise requesting play of the game (e.g., in a game played for free and/or without a risk). In some embodiments, a gaming device may provide an interface that allows a player to begin play of a first game (e.g., activate a control). A first player may use an interface to place a wager in a game (e.g., insert coins into a slot machine, press a button to begin a spin of a slot machine, make a bet from an account based wagering system in a game of craps played over the internet, and so on). A gaming server and/or other gaming device may receive an indication of such a wager and in response facilitate play of the first game. A wager may include a risk of an amount of money, points, and/or any elements. Some embodiments may not include wagers, but rather may allow free play and/or purchased play (e.g., a user may purchase play of a round but not risk any money for a potential award). In some such embodiments, a gaming server and/or device may receive an indication that a user desires to play a game without such a wager (e.g. a pressing of a button, a payment of a free to game, and so on).

In some embodiments a plurality of players may play a first game. For example, a bank of slot machines may include a plurality of machines that each allow a player to play the first game. As another example, a plurality of people may access a gaming service from respective mobile devices and play the first game. Any number of games may be played simultaneously and/or at different times by any number of people in various embodiments. In some embodiments a first game may be offered through various types of game devices. For example, one player may play at a slot machine in a casino while another player plays on a laptop computer at a home while yet another player plays at a live interactive table. Game device may be located at any number of locations such as at various casinos, in private homes, on a person, and so on.

Some embodiments may include funding a jackpot. It should be recognized that a reference to a jackpot may include a reference to any type of pool of money put together in any manner, any static amount of money, any changing amount of money, any amount of money, any award that may be funded in any manner, and so on. For example, in some embodiments, each wager placed in a first game may have a portion assigned to fund a progressive jackpot. The progressive jackpot may relate to play of the first game and/or play of another game (e.g., subsequent games, other types of games). Other types of jackpots and/or awards maybe used in some embodiments (e.g., a jackpot not funded from other games, a static jackpot, and so on). In some embodiments, winnings earned in play of one or more rounds of a game may be used to fund a jackpot (e.g., winnings of one or more rounds of a first game that qualifies one or more players to play the second game, winnings from play of a first game, winning from play of a second game, and so on). Other embodiment may not include any jackpots at all.

It should be recognized that while examples may be given in terms of a single first game, that some embodiments may include a variety of first games. For example, one player may play a slot game and another player may play a card game. Both such games may qualify as a first game in some embodiments. Some embodiments may include a set of games that qualify as a first game (e.g., games of a certain branding, games by a certain manufacturer, all games offered, games of a particular characteristic, and so on). In some embodiments, a stage of a game may be a first game. For example, a flop in a poker hand may be a first game (e.g., if all aces appear, players of the poker hand may qualify for the second game). In some embodiments, a first game may include a tournament.

In some embodiments, a player may be required to perform one or more actions to qualify a game as a first game. For example, a player may be required to make a qualifying wager (e.g., wager at least a minimum, wager on all lines, place a bonus wager, and so on). Some embodiments may include determining that a game qualifies as a first game (e.g., based on a wager placed on the game, based on the game being played, in response to information identifying a wager in a game and/or a request to play a game, and so on).

Some embodiments may include determining one or more respective resolutions to one or more respective first games played by one or more respective players. Determining a resolution may include determining an outcome based on a random number generation, determining an outcome to a wager, and so on. For example, a determination of a resolution may include determining that a wager is a winning wager, determining that a wager is a losing wager, determining an amount won by a wager, determining a particular outcome of a game, determining game indicia played in a game, determining cards dealt in a game, determining a result of a die roll, determining a roulette spin result, determining that a bonus game should be started, determining that a jackpot is won, and so on. For example, in some embodiments, a determination that a player receives particular slot symbols in a game played at a slot machine may be made. Such slot symbols may be based on a random determination. Various methods of determining results of a game that may include random event determinations are well known in the art and may be used in any combination or manner in various embodiments.

Some embodiments may include presenting an indication of an outcome to a player and/or performing one or more actions related to a game outcome. For example, in some embodiments, information identifying the game outcome may be presented through a display. Such a presentation may occur in response to a determination of the outcome. Such a presentation may be made in response to a receipt of a gaming outcome from a server. In some embodiments, a wagering account may be credited with money based on the outcome (e.g., based on a wager and/or pay table). In some embodiments presenting an outcome may include presenting an amount of money won, presenting game indicia, presenting cards, presenting slot symbols, presenting a graphic, presenting a sound, and so on.

It should be recognized that some embodiments may include making any number of determination of game outcomes for any number of players of any number of games, and/or performing any desired actions related to those outcomes in any manner. For example, game outcomes may be determined and presented for a plurality of users playing slot machine games at a slot machine bank in a casino.

Some embodiments may include determining that one or more outcomes of one or more first games qualifies one or more players for a second game. For example, such a determination may include a determination that a particular outcome of a first game played by a player qualifies the player for a second game. Some embodiments may include a determination that a bonus round outcome has been achieved by a user (e.g., a royal flush in a card game, a three of a kind in a slot game, and so on), a determination that an outcome of a set of qualifying outcomes has occurred in a game, a determination that a series of outcomes that qualifies a player for a second game has been achieved, and so on. As another example, such a determination may include a determination that a community of players has achieved a community goal based on one or more outcomes of members of the community and that the community goal qualifies some number of players to play the second game. Some embodiments may include a determination that a progressive jackpot has reached a threshold level and/or that other community based event has occurred (e.g., a number of hands have been player, an amount of money wagered, a threshold number of a particular result attained, a word spelled in a community game, a number of diamonds mined in a community game, and so on).

Some embodiments may include determining one or more players that should be qualified for play of a second game. In response to such a determination, one or more outcomes may be generated that correspond to such qualification. Accordingly, a qualification may result in an outcome rather than an outcome resulting in a qualification in some embodiments.

Some embodiments may include a determination that a set of players that make up at least a minimum and/or desired number of players for play of a second game and/or tournament of a second game should be qualified to play the second game. For example, in some embodiments, a second game may include a two player game. A first player may be qualified based on an outcome resulting in play of a first game. In one example, no other player may be qualified at that time. In response to a determination that the first player is qualified based on the outcome and that no other player is qualified at that time, a determination that a second player should be qualified so that play of the second game may commence may be made. Accordingly, the first player may be able to play the game against the second player. Such a determination may result in a game outcome being presented in the first game to the second player when it would not otherwise have been presented, and/or any indication of a qualification for the second game being presented to a second player (e.g., an indication may be shown on an interface to multiple players of multiple devices and the first to respond may be allowed to play). In some embodiments, a determination of an outcome that qualifies one person may be made for any number of desired people (e.g., a determination of an outcome that qualifies the first player may actually include a determination of an outcome that affects two people) so that such a number of desired people become qualified. For example, a determination of a qualifying outcome in a slot game may include a determination of a qualifying outcome in two slot games played by two respective players.

Player Examples

Some examples of embodiments in which one or more users are qualified to play a second game based on a first game may be described herein. It should be recognized that such examples may apply to community triggering as well. In some embodiments, qualifying may include qualifying for a single entry into a game (e.g., play one time, play in one tournament). In some embodiments, qualifying may include qualifying for a period of time, a number of games, a number of tournaments, and so on. In some embodiments, qualifying may include a permanent qualification, a qualification for all future tournaments, and so on.

In some embodiments, in response to a game outcome that qualifies a player for a second game, the player may be presented with an interface through which the player may play the second game, may be granted access to an interface through which they may play the second game, may be allowed to play the second game, and so on. For example, an interface screen may be presented to a user through a gaming device that is used to play the first game to allow the user to play the second game.

In some embodiments, a second game may include a skill based game, a luck based game, a table game, a slot game, a board game, a contest, any type of game, and so on. A skill based game may include a game in which an outcome may be determined based on a skill of a player, based at least in part on a skill of a player, and so on. In some embodiments a second game may include a competitive game. A skill based game may include a game whose outcome is not based on a random event determination. A competitive game may include a game played against an opponent (e.g., another player, a computer opponent). In some embodiments, a second game may include a competitive skill based game (e.g., a game of skill played against an opponent). In some embodiments, a second game may be part of a tournament (e.g., a tournament of skill based competitive games). Some example skill based competitive games may include chess, checkers, battleship, Halo, first person shooters, platform games, dance revolution, a word game, a strategy game, and so on. In some embodiments, a second game may include a subsequent first game.

In some embodiments, a player may be given a choice of playing a second game against a computer opponent and/or a human opponent. Some embodiments may include receiving a selection of a human and/or computer opponent. Some embodiments may not include such a selection (e.g., all games may be against a human opponent, all games maybe against a computer opponent, a choice may be made based on an availability of a human opponent). For example, in some embodiments, a computer opponent may be selected if no human opponents are available (e.g., if only a single player is qualified to play a second game, if no other players become qualified in some amount of time, and so on).

In some embodiments, if a human opponent is chosen and/or otherwise used in an embodiment, a second game may be facilitated between two human players.

Some embodiments may include a first player waiting for a second player to be able to play a second game. For example if a first player is qualified to play the second game based on a first outcome in a first game, there may be no other players qualified and/or available to play the second game at that time. A second player may eventually be qualified based on an outcome in another game played by that second player and/or eventually become available (e.g., finish another game, start a gaming session). Before that time, the first player may wait to play the second game. In some embodiments the first player may be enabled to play other games, take other actions, go unavailable and return later, and so on while waiting to play the second game. The first player may be notified when a second player is available to play the second game. A second play may be notified that the first play is available to play the game (e.g., via text message, phone call, email, by a message in an interface, and so on).

Some embodiments may include determining that a sufficient number of players are available and/or qualified to play a second game. For example, in response to determining that a first and second player are qualified to play the second game, a first and second player may be presented with an interface asking if they are available to play the game. A receipt of an indication that the first and second players are available may be received. In response to receiving such an indication, a determination that the sufficient number of players is qualified and ready may be made. In some embodiments more players may be required (e.g., a 5 player game). Any method of making a determination of players being available and/or qualified to play a second game may be used in various examples.

In some embodiments, a first and second player may be matched against each other for play of a second game. A game system may match players in response to the players being qualified and available (e.g., in a first in first matched method), based on location similarity, based on demographic similarity, and so on. Some embodiments may enable the players to play games against each other. For example, players may be presented with gaming interfaces that allow them to play the second game against each other. Players may be connected to one another and/or a gaming server through a network. Various information about actions taken by one player may be presented to another player. Players may be able to take actions through an interface in a game (e.g., shoot at each other, choose words, move pieces, and so on). It should be recognized that any desired actions may be taken that may allow two or more players to play a second game.

In some embodiments, if a computer opponent is chosen and/or otherwise used in an embodiment, a second game may be facilitated between one or more computer opponents and the player. For example, a computer opponent may take actions in the second game rather than a second human player.

Some embodiments may include determining a winner of the second game based on play by the first player and the opponent(s). For example, a winner may include a winner of a chess game, a winner of a game player in accordance with rules of aboard game, a winner of a skill based game, and so on. In some embodiments, a winner may be awarded a prize (e.g., money, a right to continue playing the second game, a move up a ladder of a tournament, and so on). In some embodiments, a loser of a second game may be disqualified from future play of the second game (e.g., unless and/or until they are re-qualified through play of a first game). In some embodiments, a winner of a second game may similarly be disqualified from play of the second game.

Community Examples

Some example embodiments in which one or more users are qualified to play a second game based on a community based event occurring are described herein. It should be recognized that such examples may apply to individual player qualification embodiments as well.

In some embodiments, in response to a community based event occurring, one or more players may be presented with an interface through which such players may play the second game, may be granted access to an interface through which they may play the second game, may be allowed to play the second game, and so on.

Some embodiments may include determining players that qualify to play the second game. In some embodiments, such players may include players that are playing the first game at a time of the community based event, players that have credits in a machine associated with the first game at a time relative to the community based event, players that have played the first game at some time relative to the community based event (e.g., within an hour of the event happening), players that have contributed to the community event occurring, players that have played the game since a last community event occurred, players that desire to play the second game during a time period relative to the community event occurring (e.g., anyone may be qualified to play the second game for 10 minutes after the community based event), and so on. It should be recognized that any determination of any players to be qualified to play a second game may be made. It should be recognized that qualifying may include qualifying for a period of time, a number of games, a number of entries, and so on.

Some embodiments may include notifying one or more players that they qualify to play a second game. Notification may include presenting an interface for the game to the player, presenting an option to the player, enabling selection of the game, and so on. In some embodiments, a notification may include a notification of a time period in which the player may play the game.

Some embodiments may include receiving an indication to play the second game from one or more players. For example, such an indication may include a pressing of a button, an agreement to play the second game, a wager in the second game, an indication of a player being ready to play the second game, and so on. Such an indication may be received by a gaming device such as a gaming server. In response to such an indication, a gaming device may facilitate play of the second game between two or more players.

Some embodiments may include providing an advantage and/or customization to one or more players of a second game based on play of a first game. For example, some embodiments may include providing one or more players that caused a community based event to be triggered, an advantage in the second game (e.g., a better placement on a board, a longer time to respond to a question, and so on).

In some embodiments, a first and second player may be match against each other for play of a second game. A game system may match players in response to the players being qualified and available (e.g., in a first in first matched method), based on location similarity, based on demographic similarity, and so on. Some embodiments may enable the players to play games against each other. For example, players may be presented with gaming interfaces that allow them to play the second game against each other. Players may be connected to one another and/or a gaming server through a network. Various information about actions taken by one player may be presented to another player. Players may be able to take actions through an interface in a game (e.g., shoot at each other, choose words, move pieces, and so on). It should be recognized that any desired actions may be taken that may allow two or more players to play a second game.

Some embodiments may include determining a winner of the second game based on play by the first player and the opponent(s). For example, a winner may include a winner of a chess game, a winner of a game player in accordance with rules of aboard game, a winner of a skill based game, and so on. In some embodiments, a winner may be awarded a prize (e.g., money, a right to continue playing the second game, a move up a ladder of a tournament, and so on). In some embodiments, a loser of a second game may be disqualified from future play of the second game (e.g., unless and/or until they are re-qualified through play of a first game). In some embodiments, a winner of a second game may similarly be disqualified form play of the second game.

Tournament Examples

Some embodiments may include facilitating a tournament of a second game among players that are qualified to play the second game. A tournament may include a bracket of pairs of players. A tournament may include a single elimination tournament. A tournament may include a competition of a plurality of players to see who can win a most games and/or most points over a time and/or number of games (e.g., in competitive and/or non-competitive games). Games of a tournament may take place simultaneously, as players are available for a next game, and so on. One or more awards may be given based on performance in a tournament.

Some embodiments may include matching users in a first level of a tournament. Such players may be matched one against another, in larger groups (e.g., for games that are more than two player games), and so on. In some embodiments, players may be matched based on a location. For example, in a first level, players that are in a same casino may be matched together, and players that are in a second casino may be matched together. In some embodiments, players may be matched based on any desired characteristic (e.g., based on demographics, based on performance in a first game, based on prior plays of the second game, based on money, and so on) and/or randomly. In some embodiments, if there are not a number of players to assign players to each have a matching number of other players (e.g., if there are an odd number of players and the game is chess), one or more players may be given a pass through a tournament level (e.g., based on money, based on performance of a first and/or prior second game, randomly, and so on), one or more players that losses a game in such a tournament level may be given a second chance to stay in the tournament by playing against such an odd player (e.g., a player with a best second game performance may be allowed to play a game against the other player), and so on. Some embodiments may include determining a location of a plurality of qualified players and based on the locations, matching the players for a tournament such that players are matched with other players that are closest to them and/or in or near a same casino or other venue in one or more rounds of a tournament.

Some embodiments may include determining one or more players that may move on to a next level of a tournament. For example, in some embodiments, winners in a first level of tournaments may be allowed to go to a next level of a tournament. Players that lose at that level may be eliminated from a tournament. A player eliminated from a tournament may not be qualified to play a second game after elimination. It should be recognized that although an example of a single elimination tournament are given, other embodiments may include other types of tournaments and/or method of determining a winner of an award (e.g., a player that scores a highest amount of points over some time, a player that wins a most amount of points over a player time, a double elimination tournament, and so on).

Some embodiments may include matching users for a next level of a tournament. Such players may be matched one against and/or, in larger groups, and so on. In some embodiments, players may be matched based on an expanding level of differing characteristics (e.g., same casino in one level of a tournament, same city in a second level of a tournament, same state in a third level of a tournament, same country in a fourth level of a tournament, last level may determine the final winner by matching country winners against each other), and so on. Any number of tournament levels may be arranged in any manner to determine a winner of a tournament. Various examples of tournaments and/or methods of determining winners of competitions are known in the art and may be used as desired. Various embodiments may include determining winners of a tournament, determining movement of a user from one round of a tormentor to a next, and so on as desired in any manner and/or combination.

Some embodiments may include determining an award of a prize to one or more users. Such an award may be based on performance in a tournament and/or otherwise related to play of a second game. For example, winner of a final round of a tournament may be awarded a jackpot, such as a progressive prize funded by play of the first game. In some embodiments, such an award may be given to other players (e.g., the top five players may receive some award). In some embodiments, for each win of a second game, a player may win some award. In some embodiments, play of a second game may be used in any desired way to determine an award of a prize (e.g., a progressive jackpot) to one or more players of a first and/or second game. Some embodiments may include paying such a prize to a player.

Process Example

Figure 3:
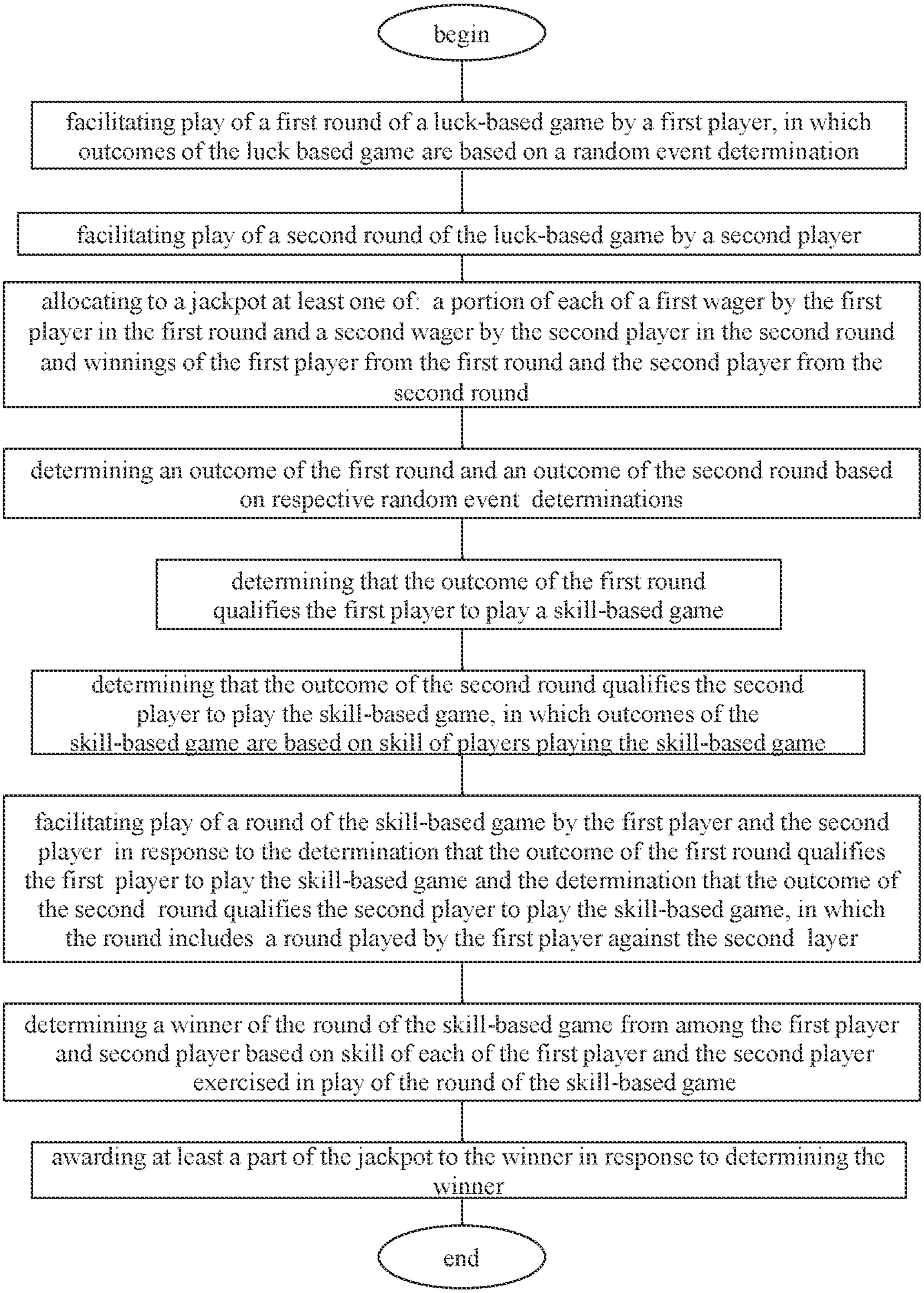
FIG. 3 shows an example process that may be used in some embodiments.
Figure 4:
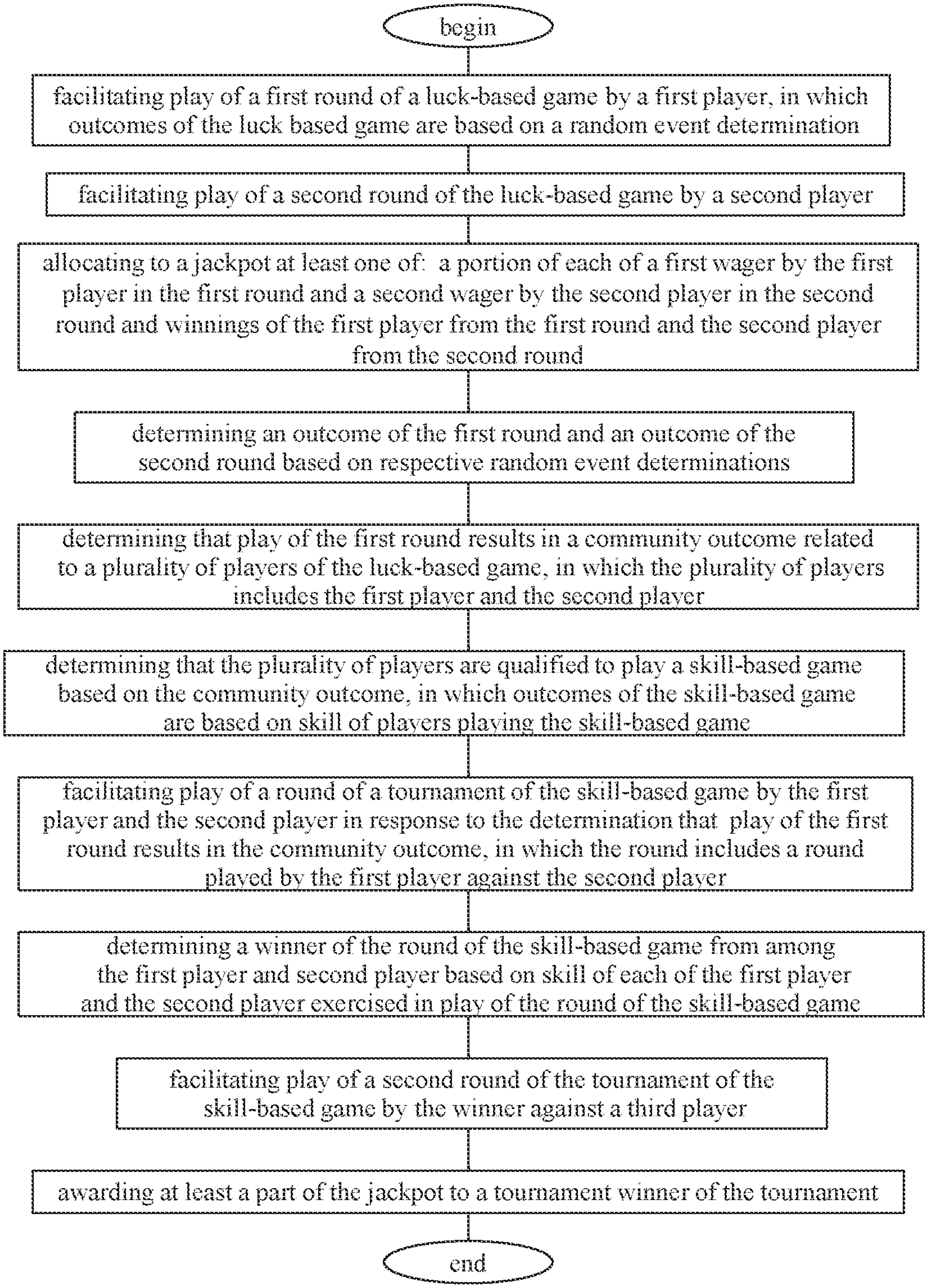
FIG. 4 shows an example process that may be used in some embodiments.

Some embodiments may include one or more processes. FIGS. 3 and 4 illustrate some example processes that may be performed in some embodiments. Such a process may be performed by one or more computing devices. For example, such a process may be performed by a gaming server and/or gaming client in some embodiments.

As illustrated in FIG. 3, in some embodiments, a process may include facilitating play of a first round of a luck-based game by a first player, in which outcomes of the luck based game are based on a random event determination; facilitating play of a second round of the luck-based game by a second player; allocating to a jackpot, by the computing device, at least one of: a portion of each of a first wager by the first player in the first round and a second wager by the second player in the second round and winnings of the first player from the first round and the second player from the second round; determining an outcome of the first round and an outcome of the second round based on respective random event determinations; determining that the outcome of the first round qualifies the first player to play a skill-based game; determining that the outcome of the second round qualifies the second player to play the skill-based game, in which outcomes of the skill-based game are based on skill of players playing the skill-based game; facilitating play of a round of the skill-based game by the first player and the second player in response to the determination that the outcome of the first round qualifies the first player to play the skill-based game and the determination that the outcome of the second round qualifies the second player to play the skill-based game, in which the round includes a round played by the first player against the second player; determining a winner of the round of the skill-based game from among the first player and second player based on skill of each of the first player and the second player exercised in play of the round of the skill-based game; and awarding at least a part of the jackpot to the winner in response to determining the winner.

As illustrated in FIG. 4, in some embodiments, a process may include facilitating play of a first round of a luck-based game by a first player, in which outcomes of the luck based game are based on a random event determination; facilitating play of a second round of the luck-based game by a second player; allocating to a jackpot, by the computing device, at least one of: a portion of each of a first wager by the first player in the first round and a second wager by the second player in the second round and winnings of the first player from the first round and the second player from the second round, determining an outcome of the first round and an outcome of the second round based on respective random event determinations; determining that play of the first round results in a community outcome related to a plurality of players of the luck-based game, in which the plurality of players includes the first player and the second player; determining that the plurality of players are qualified to play a skill-based game based on the community outcome, in which outcomes of the skill-based game are based on skill of players playing the skill-based game; facilitating play of a round of a tournament of the skill-based game by the first player and the second player in response to the determination that play of the first round results in the community outcome, in which the round includes a round played by the first player against the second player; determining a winner of the round of the skill-based game from among the first player and second player based on skill of each of the first player and the second player exercised in play of the round of the skill-based game; facilitating play of a second round of the tournament of the skill-based game by the winner against a third player; and awarding at least a part of the jackpot to a tournament winner of the tournament.

It should be recognized that such processes are given as examples only and that other embodiments may include other processes and/or no processes. For example, some embodiments may include additional, different, no, more, fewer, same, and so on action sin any combination as desired.

Architecture Example

Figure 5:
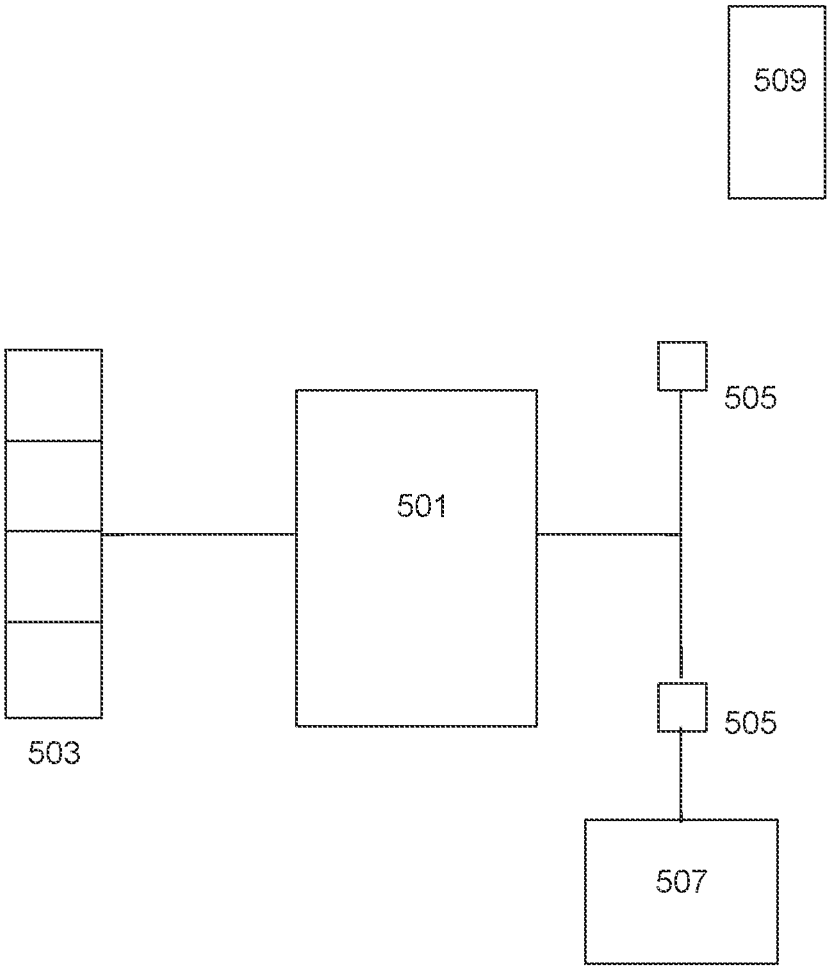
FIG. 5 shows an example of one or more devices that may be used in some embodiments.

Some embodiments may include one or more devices. FIG. 5 illustrates one example set of devices that may be used in some embodiments. As illustrated, some embodiments may include a gaming server 501, a set of slot machines 503, one or more network access points 505, one or more clients (e.g., computer 507, phone 509) and/or any desired devices in any combination. A gaming server may accept input and provide output to one or more clients through one or more networks. A gaming server may execute instructions to perform a process that may include an illustrated process and/or another process. For example, a gaming server may receive player input, determine game outcomes, determine player qualifications, receive wagers, control client devices, send information to clients, and so on. Slot machines may allow play of games, may present outputs to players, may receive outcomes from a gaming server, may provide interfaces to a user, may receive actions, and so on. Access points may allow access to a network (e.g., such as router and/or modem allowing access to the internet, a cell tower allowing access to a cell network). A client device may allow play of games, may present outputs to players, may receive outcomes from a gaming server, may provide interfaces to a user, may receive actions, and so on. It should be recognized that the illustrated set of devices are given as a non-limiting example only and that other embodiments may include any number and/or type of devices in any combination.

Battleship Example

Some embodiments may include a first and second game themed after a battleship game, a well known board game. A first game may include a battleship-themed slot game. In response to a three of a particular type of boat appearing in an outcome of a round of the battleship themed slot game, a player may be qualified to play a battleship video game as a second game. Two players that each receives such a three boat result may be matched against one another to play the battleship video game against one another. Such a battleship video game may include a video based version of the battleship game (e.g., players may place boats, choose attacks, and so on). The winner of such a battleship video game may be granted an award.

It should be recognized that various examples of games, devices, methods, and so on are given herein as non-limiting examples only. Other embodiment may include additional, alternative, fewer, more, different, same, no features as desired in any combination.

What is claimed is:

1. A method comprising:

controlling, by at least one processor:

rendering, via a communication network, on a display screen of a first mobile computing device of a first player, a graphical user interface through which a luck-based game is playable;

detecting, from the first mobile computing device, a first wager for a first round of the luck-based game;

facilitating play of the first round of the luck-based game at the first mobile computing device, in which a first outcome of the first round of the luck-based game is based on a first random event determination;

automatically and in-real time, tracking, via the communication network, a current first location of the first mobile computing device and playing habits of the first player at the first mobile computing device, during play of the first round of the luck-based game;

rendering, via the communication network, on a display screen of a second mobile computing device of a second player, a graphical user interface through which the luck-based game is playable;

detecting, from the second mobile computing device, a second wager for a second round of the luck-based game;

facilitating play of the second round of the luck-based game by the second mobile computing device, in which a second outcome of the second round of the luck-based game is based on a second random event determination;

automatically and in-real time, tracking, via the communication network, a current second location of the second mobile computing device and playing habits of the second player at the second mobile computing device, during play of the second round of the luck-based game;

allocating to a jackpot at least one of:

at least a portion of the first wager by the first mobile computing device in the first round, at least a portion of the second wager by the second mobile computing device in the second round, winnings at the first mobile computing device by the first player from the first round, or winnings at the second mobile computing device by the second player from the second round;

determining the first outcome of the first round and the second outcome of the second round respectively based on the first random event determination and the second random event determination;

determining, based on (i) the first outcome of the first round and the second outcome of the second round, (ii) whether the first player and the second player are playing the luck-based game at a time of a specified community based event, and (iii) a determination of proximity of the current first location and the current second location, whether at least one of the first player or the second player is qualified to play a skill-based game, in which the skill-based game is based on a skill of a given player playing the skill-based game;

in response to determining that the first player at the first mobile computing device and the second player at the second mobile computing device are qualified to play the skill-based game, facilitating play of a round of the skill-based game at the first mobile computing device and the second mobile computing device, in which the round includes play by the first player via a graphical user interface at the first mobile computing device against the second player via a graphical user interface at the second mobile computing device;

automatically and in-real time, via the communication network, tracking the playing habits of the first player at the first mobile computing device and the second player at the second mobile computing device during the round of the skill-based game;

determining a winner of the round of the skill-based game from between the first mobile computing device and the second mobile computing device based on the skill of the first player and the skill of the second player;

in response to determining the winner, displaying, via the communication network, on the display screen of the winner from between the first mobile computing device and the second mobile computing device, a graphical user interface indicating an award including at least a part of the jackpot;

preventing a loser of the round of the skill-based game from between the first mobile computing device and the second mobile computing device from a playing future round of the skill-based game until the loser re-qualifies through play of a second luck-based game; and in response to tracking the playing habits of the first player at the first mobile computing device and the second player at the second mobile computing device, determining wagering patterns of the first player and the second player.

2. The method of claim 1, further comprising:

controlling, by the at least one processor:

preventing a third player device from playing the skill-based game based on a third outcome of a third round of the luck-based game played by a third player, in which the third outcome of the luck-based game is based on a random event determination; and allocating at least a portion of a third wager by the third player device in the third round to the jackpot.

3. The method of claim 1, in which the facilitating play of the skill-based game includes:

receiving, from the first mobile computing device, an indication of at least one action taken by the first player;

receiving, from the second mobile computing device, an indication of at least one action taken by the second player;

rendering, on the display screen of the first mobile computing device, a graphical user interface indicating the at least one action of the second player; and rendering, on the display screen of the second mobile computing device, a graphical user interface indicating the at least one action of the first player.

4. The method of claim 1, in which the luck-based game includes:

a single player game; and at least one of a slot game or a casino game.

5. The method of claim 1, in which the skill-based game includes:

a multiplayer game; and at least one of a first person shooter or a board game.

6. An apparatus comprising:

at least one processor configured to control:

rendering, via a communication network, on a display screen of a first mobile computing device of a first player, a graphical user interface through which a luck-based game is playable;

detecting, from the first mobile computing device, a first wager for a first round of the luck-based game;

facilitating play of the first round of the luck-based game at the first mobile computing device, in which a first outcome of the first round of the luck-based game is based on a first random event determination;

automatically and in-real time, tracking, via the communication network, a current first location of the first mobile computing device and playing habits of the first player at the first mobile computing device, during play of the first round of the luck-based game;

rendering, via the communication network, on a display screen of a second mobile computing device of a second player, a graphical user interface through which the luck-based game is playable;

detecting, from the second mobile computing device, a second wager for a second round of the luck-based game;

facilitating play of the second round of the luck-based game by the second mobile computing device, in which a second outcome of the second round of the luck-based game is based on a second random event determination;

automatically and in-real time, tracking, via the communication network, a current second location of the second mobile computing device and playing habits of the second player at the second mobile computing device, during play of the second round of the luck-based game;

allocating to a jackpot at least one of:

at least a portion of the first wager by the first mobile computing device in the first round, at least a portion of the second wager by the second mobile computing device in the second round, winnings at the first mobile computing device by the first player from the first round, or winnings at the second mobile computing device by the second player from the second round;

determining the first outcome of the first round and the second outcome of the second round respectively based on the first random event determination and the second random event determination;

determining, based on (i) the first outcome of the first round and the second outcome of the second round, (ii) whether the first player and the second player are playing the luck-based game at a time of a specified community based event, and (iii) a determination of proximity of the current first location and the current second location, whether at least one of the first player or the second player is qualified to play a skill-based game, in which the skill-based game is based on a skill of a given player playing the skill-based game;

in response to determining that the first player at the first mobile computing device and the second player at the second mobile computing device are qualified to play the skill-based game, facilitating play of a round of the skill-based game at the first mobile computing device and the second mobile computing device, in which the round includes play by the first player via a graphical user interface at the first mobile computing device against the second player via a graphical user interface at the second mobile computing device;

automatically and in-real time, via the communication network, tracking the playing habits of the first player at the first mobile computing device and the second player at the second mobile computing device during the round of the skill-based game;

determining a winner of the round of the skill-based game from between the first mobile computing device and the second mobile computing device based on the skill of the first player and the skill of the second player;

in response to determining the winner, displaying, via the communication network, on the display screen of the winner from between the first mobile computing device and the second mobile computing device, a graphical user interface indicating an award including at least a part of the jackpot;

preventing a loser of the round of the skill-based game from between the first mobile computing device and the second mobile computing device from a playing future round of the skill-based game until the loser re-qualifies through play of a second luck-based game; and in response to tracking the playing habits of the first player at the first mobile computing device and the second player at the second mobile computing device, determining wagering patterns of the first player and the second player.

7. The apparatus of claim 6, in which the at least one processor is configured to control:

preventing a third player device from playing the skill-based game based on a third outcome of a third round of the luck-based game played by a third player, in which the third outcome of the luck-based game is based on a random event determination; and allocating at least a portion of a third wager by the third player device in the third round to the jackpot.

8. The apparatus of claim 6, in which the facilitating play of the skill-based game includes:

receiving, from the first mobile computing device, an indication of at least one action taken by the first player;

receiving, from the second mobile computing device, an indication of at least one action taken by the second player;

rendering, on the display screen of the first mobile computing device, a graphical user interface indicating the at least one action of the second player; and rendering, on the display screen of the second mobile computing device, a graphical user interface indicating the at least one action of the first player.

9. The apparatus of claim 6, in which the luck-based game includes:

a single player game; and at least one of a slot game or a casino game.

10. The apparatus of claim 6, in which the skill-based game includes:

a multiplayer game; and at least one of a first person shooter or a board game.

11. A non-transitory medium configured to store instructions which, when executed by at least one processor, control:

rendering, via a communication network, on a display screen of a first mobile computing device of a first player, a graphical user interface through which a luck-based game is playable;

detecting, from the first mobile computing device, a first wager for a first round of the luck-based game;

facilitating play of the first round of the luck-based game at the first mobile computing device, in which a first outcome of the first round of the luck-based game is based on a first random event determination;

automatically and in-real time, tracking, via the communication network, a current first location of the first mobile computing device and playing habits of the first player at the first mobile computing device, during play of the first round of the luck-based game;

rendering, via the communication network, on a display screen of a second mobile computing device of a second player, a graphical user interface through which the luck-based game is playable;

detecting, from the second mobile computing device, a second wager for a second round of the luck-based game;

facilitating play of the second round of the luck-based game by the second mobile computing device, in which a second outcome of the second round of the luck-based game is based on a second random event determination;

automatically and in-real time, tracking, via the communication network, a current second location of the second mobile computing device and playing habits of the second player at the second mobile computing device, during play of the second round of the luck-based game;

allocating to a jackpot at least one of:

at least a portion of the first wager by the first mobile computing device in the first round, at least a portion of the second wager by the second mobile computing device in the second round, winnings at the first mobile computing device by the first player from the first round, or winnings at the second mobile computing device by the second player from the second round;

determining the first outcome of the first round and the second outcome of the second round respectively based on the first random event determination and the second random event determination;

determining, based on (i) the first outcome of the first round and the second outcome of the second round, (ii) whether the first player and the second player are playing the luck-based game at a time of a specified community based event, and (iii) a determination of proximity of the current first location and the current second location, whether at least one of the first player or the second player is qualified to play a skill-based game, in which the skill-based game is based on a skill of a given player playing the skill-based game;

in response to determining that the first player at the first mobile computing device and the second player at the second mobile computing device are qualified to play the skill-based game, facilitating play of a round of the skill-based game at the first mobile computing device and the second mobile computing device, in which the round includes play by the first player via a graphical user interface at the first mobile computing device against the second player via a graphical user interface at the second mobile computing device;

automatically and in-real time, via the communication network, tracking the playing habits of the first player at the first mobile computing device and the second player at the second mobile computing device during the round of the skill-based game;

determining a winner of the round of the skill-based game from between the first mobile computing device and the second mobile computing device based on the skill of the first player and the skill of the second player;

in response to determining the winner, displaying, via the communication network, on the display screen of the winner from between the first mobile computing device and the second mobile computing device, a graphical user interface indicating an award including at least a part of the jackpot;

preventing a loser of the round of the skill-based game from between the first mobile computing device and the second mobile computing device from a playing future round of the skill-based game until the loser re-qualifies through play of a second luck-based game; and in response to tracking the playing habits of the first player at the first mobile computing device and the second player at the second mobile computing device, determining wagering patterns of the first player and the second player.

12. The non-transitory medium of claim 11, in which the at least one processor is configured to control:

preventing a third player device from playing the skill-based game based on a third outcome of a third round of the luck-based game played by a third player, in which the third outcome of the luck-based game is based on a random event determination; and allocating at least a portion of a third wager by the third player device in the third round to the jackpot.

13. The non-transitory medium of claim 11, in which the facilitating play of the skill-based game includes:

receiving, from the first mobile computing device, an indication of at least one action taken by the first player;

receiving, from the second mobile computing device, an indication of at least one action taken by the second player;

rendering, on the display screen of the first mobile computing device, a graphical user interface indicating the at least one action of the second player; and rendering, on the display screen of the second mobile computing device, a graphical user interface indicating the at least one action of the first player.

14. The non-transitory medium of claim 11, in which the luck-based game includes:

a single player game; and at least one of a slot game or a casino game.

15. The non-transitory medium of claim 11, in which the skill-based game includes:

a multiplayer game; and at least one of a first person shooter or a board game.

* * * * *